United States Patent
DiPerna et al.

(10) Patent No.: US 10,230,827 B2
(45) Date of Patent: Mar. 12, 2019

(54) EMERGENCY PERSONAL PROTECTION SYSTEM INTEGRATED WITH MOBILE DEVICES

(71) Applicants: Samantha DiPerna, Los Angeles, CA (US); Jacqueline DiPerna, Los Angeles, CA (US)

(72) Inventors: Samantha DiPerna, Los Angeles, CA (US); Jacqueline DiPerna, Los Angeles, CA (US)

(*) Notice: Subject to any disclaimer, the term of this patent is extended or adjusted under 35 U.S.C. 154(b) by 415 days.

(21) Appl. No.: 13/897,353

(22) Filed: May 17, 2013

(65) Prior Publication Data

US 2013/0337875 A1 Dec. 19, 2013

Related U.S. Application Data

(63) Continuation of application No. 11/333,809, filed on Jan. 17, 2006, now Pat. No. 8,472,915.

(60) Provisional application No. 60/643,865, filed on Jan. 14, 2005.

(51) Int. Cl.
| | |
|---|---|
| *H04M 1/00* | (2006.01) |
| *H04M 1/02* | (2006.01) |
| *F41H 9/10* | (2006.01) |
| *G08B 15/02* | (2006.01) |
| *G08B 25/01* | (2006.01) |
| *H04M 1/21* | (2006.01) |
| *H04M 1/725* | (2006.01) |
| *H04B 1/3888* | (2015.01) |
| *H04M 11/04* | (2006.01) |

(52) U.S. Cl.
CPC .............. *H04M 1/026* (2013.01); *F41H 9/10* (2013.01); *G08B 15/02* (2013.01); *G08B 25/016* (2013.01); *H04B 1/3888* (2013.01); *H04M 1/21* (2013.01); *H04M 1/72519* (2013.01); *H04M 1/72541* (2013.01); *H04M 11/04* (2013.01); *H04M 1/7255* (2013.01); *H04M 1/72552* (2013.01); *H04M 2250/10* (2013.01)

(58) Field of Classification Search
CPC ................................ H04B 1/3888; F41H 9/10
See application file for complete search history.

(56) References Cited

U.S. PATENT DOCUMENTS

| | | | | |
|---|---|---|---|---|
| 4,477,005 | A | * 10/1984 | Martinez | F41H 9/10 224/218 |
| 5,476,192 | A | * 12/1995 | Julinot | B65D 83/384 116/81 |
| 5,973,477 | A | * 10/1999 | Chang | H01M 10/425 320/114 |
| 5,988,450 | A | * 11/1999 | Cassarino | F41H 9/10 222/192 |
| 7,515,900 | B2 | 4/2009 | Van Camp | |
| 2002/0108966 | A1 | 8/2002 | Park | |

(Continued)

*Primary Examiner* — Ping Y Hsieh

(57) ABSTRACT

A mobile device includes a camera unit, a location unit, a transmitting unit, a self-defense mechanism, and a panic button. The camera unit location unit obtains at least one of image data and audio data, and the location unit obtains location data. The transmitting unit transmits at least one of the image data, the audio data, the location data, and specific information including owner identification information. The panic button is adapted to activate the camera, the location unit, the transmitting unit, and the self-defense mechanism.

20 Claims, 3 Drawing Sheets

(56) References Cited

U.S. PATENT DOCUMENTS

| | | | |
|---|---|---|---|
| 2002/0187756 A1* | 12/2002 | Chen | B26B 19/48 |
| | | | 455/575.1 |
| 2003/0003950 A1* | 1/2003 | Kroll | H04B 1/3833 |
| | | | 455/557 |
| 2003/0050088 A1* | 3/2003 | Kroll | H04B 1/3833 |
| | | | 455/550.1 |
| 2003/0222889 A1* | 12/2003 | Parulski | H04N 1/00127 |
| | | | 345/619 |
| 2004/0121756 A1 | 6/2004 | Griffin et al. | |
| 2004/0137938 A1 | 7/2004 | Deubler, Jr. | |
| 2004/0155084 A1* | 8/2004 | Brown | A45C 13/30 |
| | | | 224/623 |
| 2004/0185900 A1* | 9/2004 | McElveen | H04M 1/72522 |
| | | | 455/556.1 |
| 2004/0203570 A1 | 10/2004 | Berger | |
| 2005/0227833 A1* | 10/2005 | Wilkinson | A63B 21/0004 |
| | | | 482/124 |
| 2006/0011687 A1* | 1/2006 | Wadley | A45F 3/00 |
| | | | 224/587 |

\* cited by examiner

EMERGENCY PERSONAL PROTECTION SYSTEM INTEGRATED WITH MOBILE DEVICES

CROSS-REFERENCE TO RELATED APPLICATION

The present application is a continuation of application Ser. No. 11/333,809, filed Jan. 17, 2006, now U.S. Pat. No. 8,472,915 issued on Jun. 25, 2013, which claims the benefit of priority based on U.S. provisional application No. 60/643,865, filed Jan. 14, 2005. The present application also claims the benefit of priority based on U.S. provisional application No. 60/643,865. The contents of both application Ser. Nos. 11/333,809 and 60/643,865 are hereby incorporated by reference herein in their entirety, as if fully set forth herein.

BACKGROUND OF THE INVENTION

1. Field of the Invention

This invention relates generally to the field of personal safety devices, and more particularly to a personal safety device which can be used in conjunction with, or is integrated with, a mobile device.

2. Description of the Related Art

Each year many people are assaulted or otherwise find themselves victims or potential victims of violent crime. Protecting ourselves and our loved ones from these types of crime has always been of paramount importance. Women can be particularly susceptible to crimes of physical assault and violence. According to the U.S. Census Bureau, 231,589,260 people were victims of a crime in 2002. Of these victims, 119,347,330 were women, many of these women having been subjected to awful violent crimes including rape, sexual assault, and robbery, some injured, and some threatened with a weapon. Stalking is another major concern; according to results obtained by a recent National Violence Against Women Survey, women are the primary victims of stalking.

The inventors of this patent application, being college women, understand these statistics and dangers on a very personal level. Because of the traditional campus setting, there is a low dependency for the use of cars as primary transportation; as such, college women walk almost everywhere. The highly active college lifestyle often requires students to walk to and from class, the library, the grocery store, and local hang-out areas.

Of course, the particular threat to women notwithstanding, violent crime is a serious threat to people of both sexes, and of all ages. Many people often find themselves in a potentially dangerous situation in which they are confronted by an attacker. Defending oneself in this situation is of extreme importance.

There are, of course, a number of self-defense devices and mechanisms currently available on the market, including pepper spray and mace. Pepper spray (oleoresin capsicum), typically provided in strengths of 5-10%, may cause a number of undesirable effects such as eye and skin irritation and burning, shortness of breath, etc., thus aiding in warding off a potential attacker for several minutes. Typically, some sprays can be used at a range of 8-20 feet from an attacker and can come in containers including anywhere from, e.g., half an ounce to 12 ounces of spray.

Mace contains CN Tear Gas and typically results in similar effects as pepper spray, including tearing and eye closure. Either substance may contain a dye (visible or ultraviolet) for identifying an attacker once sprayed onto him, or a foaming agent which causes the spray to rapidly expand upon contact into a sticky foam which can increase the irritation to the attacker.

Another self-defense device is a stun gun which causes an electric shock upon contact with skin, typically resulting in confusion, disorientation, weakness, and loss of muscle control for several minutes. Stun guns typically vary in voltage levels from 65,000V-125,000V.

There are also "nuisance" type products such as a stench ointment contained in a small breakable vial which, when broken, can dowse the attacker with a foul smelling ointment. Another device is a personal alarm which emits a loud, high decibel (e.g. 100 db) piercing sound upon being activated by switch or separation of strap.

There are a number of drawbacks associated with existing self-defense devices, however. One drawback, for example, is that even when a person owns one of these devices, he or she will often forget to carry the device while traveling. Another drawback is that victims are often attacked while alone, and are therefore often left to fend off an attacker by themselves without anyone else knowing that they are being attacked. There is a need for providing a self defense device which is capable of immediately notifying the authorities that an attack is under way, and of providing the authorities with specific information in order to be able to come to the aid of the person being attacked.

There is a need, therefore, for a self defense device that can overcome these and other problems associated with prior art devices and thereby increase personal safety in vulnerable situations.

SUMMARY OF THE INVENTION

Accordingly, it is an object of this invention to provide a self-defense device that a person may be less likely to forget to carry while traveling. It is also an object of this invention to provide a self defense device which is capable of quickly notifying the authorities that an attack is under way, and of providing the authorities with specific information in order to be able to come to the aid of the person being attacked.

There is a large number of subscribers to mobile devices in the United States alone. These devices include, but are not limited to, cellular telephones, beepers, pagers, ipods, and Blackberry-type devices. Many of these subscribers routinely carry their mobile device on their person, often attaching it to an article of clothing such as a belt so that the device is easily accessible.

The present invention provides a self-defense device which is integrated with a mobile phone/device. In one embodiment, the present invention provides a self-defense mechanism that is attached to a mobile phone/device. The self-defense mechanism can be removably and easily attached to the mobile phone/device. This can be done by way of a clip, or by way of a protective case which holds the mobile device and which has a pocket for a self-defense mechanism such as pepper spray, the pocket in one embodiment holding the vial of pepper spray in position such that it is ready to be used with only minimal steps such as the removal of a protective cap or cover. The self-defense mechanism can also be permanently secured to a mobile phone/device. If the self-defense mechanism is attached to the mobile phone/device, a person who is carrying his or her mobile phone/device would also be carrying the self-defense mechanism. As used in this application, the term "self-defense mechanism" is included but not limited to pepper spray or mace, a dye for identifying an attacker, a foaming agent, a stun gun, a stench, a personal alarm, and a panic button.

In another embodiment, the present invention provides a self-defense device including a self-defense mechanism which is integrated with a mobile phone/device such that when the self-defense mechanism is activated, a camera built into the mobile phone/device takes an image of the attacker, and the mobile phone/device sends image data and audio data to the authorities along with specific information such as, for example, the name and description of the owner of the self-defense device, location information, a time and date stamp, etc. In this way, the present invention utilizes a built-in camera to take still or moving images of the attacker and send the image and/or audio data to the authorities along with the specific information. The self-defense mechanism can be a vial containing pepper spray or mace, for example, or simply a separate panic button located on the device which activates the above-mentioned processes. Of course, the present invention is not limited to the examples discussed herein.

In this way, the present invention can provide a powerful solution for one confronted with a dangerous situation. Further, the present invention can be attachable to or integrated with something many people routinely carry with them—a mobile phone or device.

The present invention according to one embodiment provides a case, comprising a main pocket for receiving a mobile device, at least one side pocket for receiving a self-defense mechanism, and a cover for covering the opening of the side pocket.

The self-defense mechanism may be at least one of a vial containing pepper spray, a vial containing mace, a vial containing dye, a vial containing a foaming agent, a vial containing a stench ointment, a stun gun, and a personal alarm. The cover may close the side pocket by way of one of velcro and a snap.

The present invention according to another embodiment provides a self-defense device comprising a mobile device and a self-defense mechanism attached to the mobile device, wherein the self-defense mechanism is at least one of a vial containing pepper spray, a vial containing mace, a vial containing dye, a vial containing a foaming agent, a vial containing a stench ointment, a stun gun, and a personal alarm.

The self-defense mechanism may be attached to the mobile device by way of a clip. The self-defense mechanism may be removably attached to the mobile device. The self-defense mechanism may be permanently secured to the mobile device.

The present invention according to another embodiment provides a mobile device, comprising a camera unit, adapted to obtain at least one of image data and audio data; a location unit, adapted to obtain location data; a transmitting unit, adapted to transmit at least one of the image data, the audio data, and the location data; and a panic button, adapted to activate the camera, the location unit, and the transmitting unit.

A voice activation unit may be provided which activates the panic button using a codeword. The panic button may be activated by at least one of: (1) a depressing or series of depressions of the panic button, (2) a depressing of the panic button for a predetermined time period, (3) a depressing of the panic button together with another button, and (4) a codeword. The location unit may obtain the location data through GPS. The location unit may obtain the location data through cell tower-based triangulation.

The present invention in another embodiment provides a mobile device, comprising a camera, adapted to obtain at least one of image data and audio data; a location unit, adapted to obtain location data; a transmitting unit, adapted to transmit at least one of the image data, the audio data, and the location data; a self-defense mechanism; and a panic button, adapted to activate the camera, the location unit, the transmitting unit, and the self-defense mechanism.

The location unit may obtain the location data through at least one of GPS and cell tower-based triangulation. The self-defense mechanism may be at least one of a vial containing pepper spray, a vial containing mace, a vial containing dye, a vial containing a foaming agent, a vial containing a stench ointment, a stun gun, and a personal alarm.

The present invention in another embodiment provides a mobile device, comprising a camera unit, adapted to obtain at least one of image data and audio data; a location unit, adapted to obtain location data; a transmitting unit, adapted to transmit at least one of the image data, the audio data, the location data, and specific information including owner identification information; a self-defense mechanism; and a panic button, adapted to activate the camera, the location unit, the transmitting unit, and the self-defense mechanism.

The specific information may include a time and date stamp. The specific information may include a pre-recorded personal warning message. The panic button may be silent. The self-defense mechanism may be at least one of a vial containing pepper spray, a vial containing mace, a vial containing dye, a vial containing a foaming agent, a vial containing a stench ointment, a stun gun, and an audible personal alarm. The panic button may activate an audible warning message.

BRIEF DESCRIPTION OF THE DRAWING

The invention will be more clearly understood by reference to the following detailed description of exemplary embodiments in conjunction with the accompanying drawings, in which.

DETAILED DESCRIPTION OF THE PREFERRED EMBODIMENTS

Figure 1A:
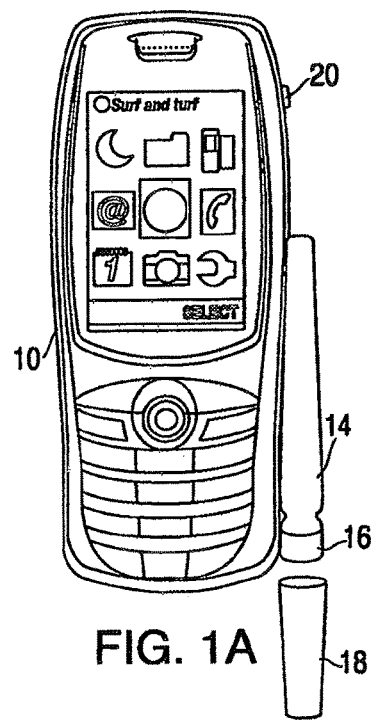
FIG. 1A is an illustration of the present invention according to one embodiment.

As mentioned above, the present invention provides a self-defense device which is integrated with or used with a mobile phone/device. In one embodiment, the present invention provides a self-defense mechanism that is attached to a mobile phone/device. This can be done, for example, by way of a clip, or by manufacturing the mobile device such that the self-defense mechanism is permanently attached thereto; of course, the present invention is not limited to these examples. In another embodiment, a protective case holds the phone (e.g. in a main pocket) and has a pocket (e.g. a side pocket) for a self-defense mechanism such as pepper spray, the pocket in one embodiment holding the vial of pepper spray in position such that it is ready to be used with only minimal steps such as the removal of a protective cap or cover. The self-defense mechanism can also be permanently secured to a mobile phone/device as explained. The self-defense mechanism can be, for example, a vial containing pepper spray or mace, a personal alarm, a stun gun, a stench ointment, or the like.

The self-defense mechanism can be attached to the phone or can be contained within a protective case made out of leather or any other suitable material. In one embodiment the protective case covers the mobile phone/device and has a side pocket containing the self-defense mechanism (for example, a vial of pepper spray) which can be kept closed by way of velcro, a snap, a protective cap, or the like. The pepper spray (in this example) is in position and ready to be used as soon as the protective covering is removed. The vial of pepper spray can easily be replaced or refilled. In another embodiment the self-defense mechanism clips or is otherwise securely attached to the outside of a side pocket/loop of the protective case, making the self-defense mechanism easy to remove, if necessary. In this way, the present invention offers a smart design that can be flexible, attractive, convenient, small and portable, and effective. Further, if the self-defense mechanism is contained within a protective case, it can be hidden from an attacker until the moment it is used, thereby enhancing the victim's advantage of surprise.

In another embodiment, the present invention provides a self-defense device including a self-defense mechanism which is integrated with a mobile phone/device such that when the self-defense mechanism is activated, a camera built into the mobile phone/device takes still or moving images of the attacker, and the mobile phone/device sends the image data to the authorities along with specific information such as, for example, the name and description of the owner of the self-defense device, the location information, etc. audio information can be obtained by the camera and sent as well. In this way, the present invention utilizes a built-in camera to take image(s) of the attacker and send the specific information to the authorities along with the image information and audio information. The self-defense mechanism can be, for example, a vial containing pepper spray or mace, a personal alarm, a stun gun, a stench ointment, or the like. Further, the self-defense mechanism can be a separate panic button located on the device which activates the above-mentioned processes.

The present invention integrates with mobile phones/devices to send image data of the attack, which could be either still image data or moving video, along with location information, and/or audio information, so that help can be dispatched right away. The system can be linked in with an emergency assistance number such as 911 or to a private emergency network specifically set up for these purposes to work with the public authorities in assisting victims. By virtue of the features of the present invention, authorities will be able to proceed directly to the location of the incident, equipped with specific information such as location information, image and/or audio data of the attack (which can of course aid in identifying the perpetrator), and information as to who owns the mobile phone/device including a description of that person. Audio data (either a pre-recorded help message or audio of the attack itself) can also be sent to the authorities.

The self-defense device can be activated by way of a panic button and/or can be voice activated, for example, upon the shout of a voice command by the victim. Because a situation in which one is confronted by an attacker is inherently unpredictable, it would be advantageous for potential victims to have the flexibility to proceed as they feel the situation dictates. Therefore, by virtue of the features of the present invention, the user may keep secret, from the attacker, the fact that the victim has alerted the authorities (e.g. through pressing a silent panic button), or may advertise that fact to the attacker (e.g. through pressing a panic button which is also an alarm). The victim may alert help without saying a word, if the victim deems that the best response to the situation.

The ease of use and convenience of the present invention is an important factor in the effectiveness of a self-defense device. In addition, the present invention can be a subtle way to carry protection. An attacker would likely not assume that a mobile phone can have a weapon and be so easily and effectively linked to a safety network. The present invention can maximize the effectiveness of personal self-defense mechanisms by being integrated with a convenient accessory—a mobile phone or device. A mobile phone/device is now something that is often routinely found among a person's attire, whether worn on a person's belt buckle or carried in a pocket or in a purse, and can be convenient to locate.

The present invention in one embodiment communicates the emergency information (image information, location information, owner information, etc.) through a TCP/IP (Transmission Control Protocol/Internet Protocol) connection on the phone or mobile device, or through another such as WAP (Wireless Application Protocol). TCP/IP is a communications protocol that is used to connect hosts on the internet, and TCP/IP is the de facto standard for transmitting data over networks. The present invention may also use an MMS (Multimedia Message Service) system, which is a mix between internet protocol and e-mail protocol. More specifically, MMS is a store-and-forward method of transmitting graphics, video clips, sound files, and short text messages over wireless networks using WAP. MMS implementations also support e-mail addressing, so that the device can send e-mails directly to an e-mail address. The presentation of the MMS message is coded into the presentation file so that images, sounds, and text are displayed in a predetermined order as one singular message. The most common use of MMS is for communication between mobile phones/devices. MMS is one method enabling the present invention to obtain video/audio information and send the data to a specified location. Of course, the present invention is not limited to using protocols such as TCP/IP and MMS.

To expand upon this further, there are a number of ways to send image data and audio data using the present invention. As one example, image data can be sent through regular e-mail to a dispatching center and then to a police station. As another example, image data can be sent through a picture-based e-mail type system (such as MMS). As another example, image data can be sent through a regular TCP/IP to a web service, which enables internet access on a cell phone. Of course, the present invention is not limited to these examples, and various modifications are envisioned.

Further, cellular telephones typically comply with e-911, which is emergency 911. Thus, when one dials 911, the dispatch operator can immediately obtain the location. For example, the panic button of the present invention can automatically contact 911 upon a press or series of presses of the button, or upon a codeword. There can also be a separate "safety" switch which, upon being moved into position, readies the panic button to contact 911 upon being pressed. The panic button can be activated upon dialing 911 itself or upon pressing the panic button along with an emergency touchpad "picture." The present invention can obtain location information in a number of different ways, for example through a tower-based location system. As is well known in the art, cell towers triangulate to figure out where a person is. As another example, the present invention can also obtain location information through a form of GPS (Global Positioning System) on the device (GPS or AGPS, which is assisted GPS). Location information for the present invention can be an x-y coordinate or close to it that the phone obtains and transmits to 911. Altitude information can be included as well.

In one example, pushing a "panic button" on the mobile phone/device of the present invention can result in a still image or moving video being taken, as well as an audio recording being obtained. The present invention then wraps the data up and transmits it to an emergency service with the x-y coordinates. This enables the emergency service to have image and/or audio data as well as the relevant location information. Other features are included as well. For example, a panic button can trigger the image/audio data and location information being obtained. Further, the panic button can also trigger a separate self-defense mechanism such as pepper spray, mace, or a personal alarm. These can be triggered by a panic button or buttons or button sequence. These can also be triggered by, for example, a "code word" that the user shouts. Or they can be triggered more silently so that the attacker does not know that his picture has been taken and the image data and location information transmitted. Also, the mobile phone/device of the present invention can announce loudly through its speaker a warning messaged to the attacker (e.g "911 has been notified and your picture has been taken!") or other messages, such as the location information. The user is provided with various options such as the above and is provided with the ability to configure his or her device according to what he or she feels is best.

In another embodiment the present invention contains a panic button and a separate button or nozzle to activate pepper spray or the like, and these two buttons are tied together so that one or more features of the present invention (e.g. picture/audio and location information transmitted, mace activated, warning sounds) occur at once.

In another embodiment the present invention allows the user to pre-record a personal warning message which is transmitted to the emergency personnel in the event of an attack during a specific time period. For example, if one is traveling to a meeting at 2 pm, she could program the device to transmit a specific warning message if the panic button is activated between the hours of 2 pm-4 pm. For example: "It is now Sunday, Janauary 15$^{th}$. I will be traveling to Sherborn, Mass. for a 2 pm meeting with Mr. John Smith who lives on Gray Road."

According to another embodiment, the panic button can be a big (e.g. red) button in the center of the phone (or elsewhere on the phone) that the user holds down for a predetermined time period. This can safeguard against falsely triggering the device. Other safeguards can include a button sequence, the number of times a button is depressed, etc. The user can choose to dial or say 911 and thereby activate the device that way. Or the user can have their own special code word for activation. The button can send a signal to a controller inside the device to activate this process. The button can start the speech recognition process in one embodiment, to trigger the device.

FIG. 1A illustrates the present invention according to one embodiment. In FIG. 1A, the self-defense mechanism, in this example pepper spray or mace, is permanently attached to the mobile device 10. Specifically, mobile device 10 has a vial 14 containing pepper spray or mace attached thereto. Nozzle 16 releases the pepper spray or mace once protective cap 18 is removed. Panic button 20 is included in this embodiment.

Figure 1B:
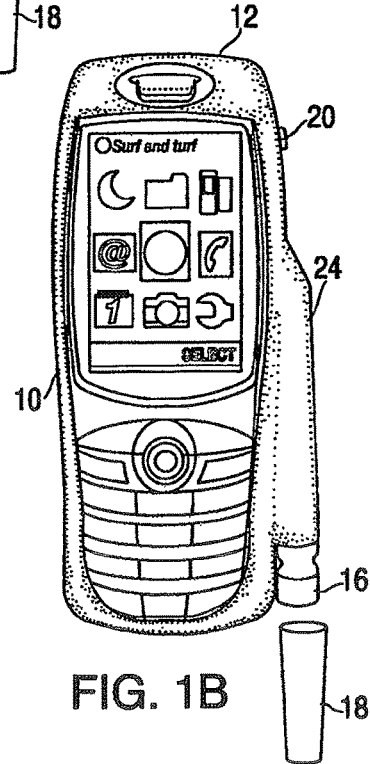
FIGS. 1B-E are illustrations of the present invention according to another embodiment.
Figure 1C:
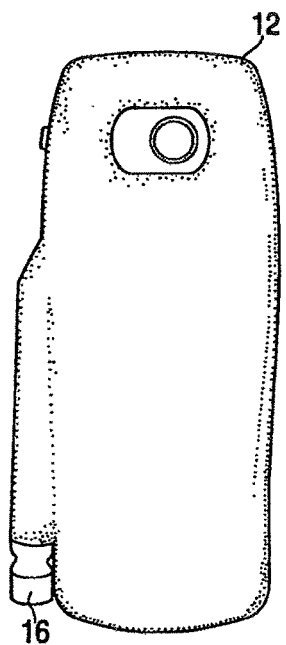
Figure 1D:
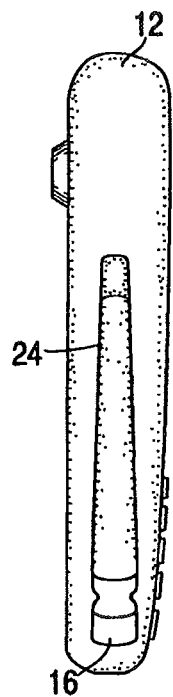
Figure 1E:
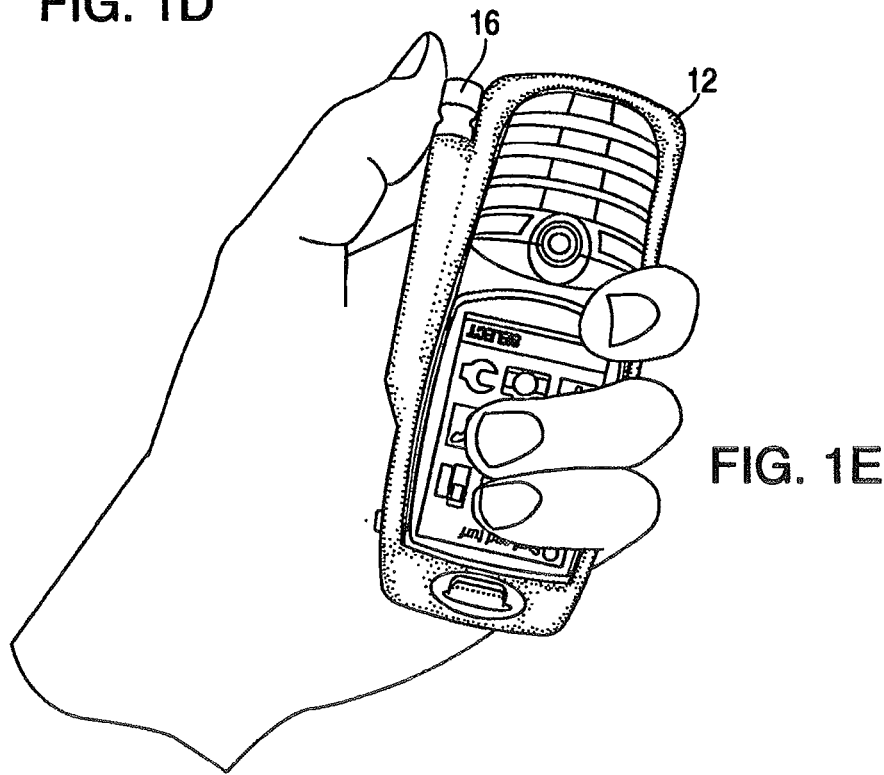

FIGS. 1B-E illustrate the present invention according to another embodiment. In FIGS. 1B-E, protective case 12 surrounds the mobile device 10 and has a side pocket 24 which houses the vial of pepper spray or mace. FIG. 1B is a front view, while FIGS. 1C and 1D are rear and side views, respectively. Camera lens 22 is disposed at the rear of the device.

Figure 2C:
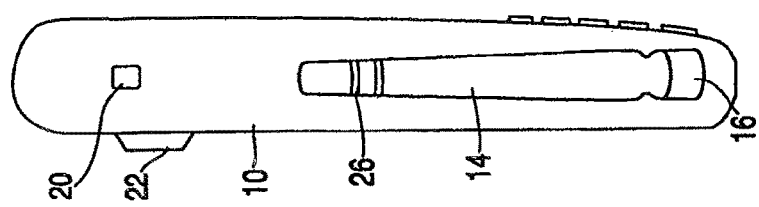
FIGS. 2A-C are illustrations of the present invention according to an embodiment.
Figure 2B:
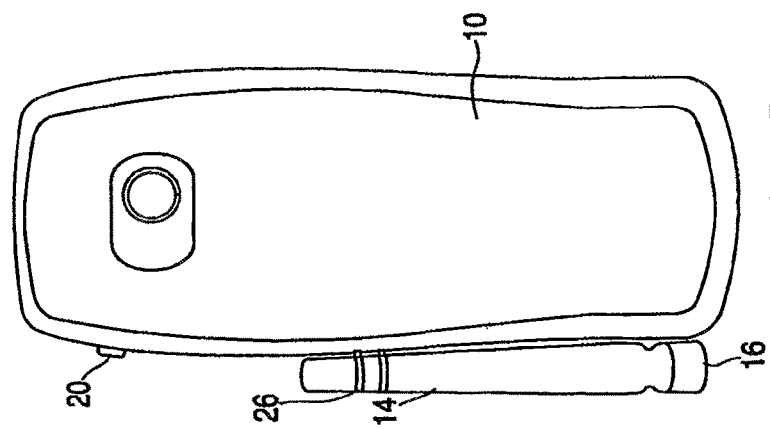
Figure 2A:
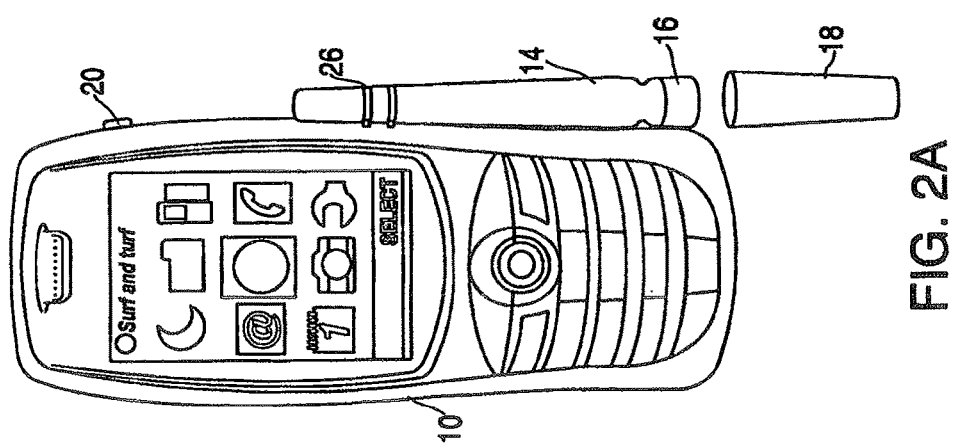

FIGS. 2A-C illustrate the present invention according to another embodiment. In this embodiment a vial 14 of pepper spray or mace is clipped to the body of the mobile device 10 via clip 26. The clip can of course take on many forms, for example a male mating portion located on the vial 14 and a female mating portion located on the mobile device 10. FIGS. 2A, 2B, and 2C are front, rear, and side views, respectively.

It is of course to be understood that various modifications are envisioned. For example, the features of the present invention can be combined as desired. As an example, a mobile device having a panic button and its associated features may or may not also have a vial containing pepper spray (or another self-defense mechanism) attached thereto. As another example, a mobile device having a vial of pepper spray (or another self-defense mechanism) may or may not have a panic button feature. The present invention is of course not limited to the examples set forth herein.

The present invention is for use with all mobile devices including, but not limited to, cellular telephones, beepers, pagers, ipods, and Blackberry-type devices.

While the invention has been particularly shown and described with respect to preferred embodiments thereof, it will be understood by those skilled in the art that changes in form and details may be made therein without departing from the scope and spirit of the invention.

Having described the invention, what is claims as new and secured by Leters Patent is:

1. A case for a mobile device, comprising:
   a front, a back, and two sides;
   a main pocket disposed at the front of the case for receiving the mobile device, wherein the main pocket is configured to receive all four corners of the mobile device and to show a display of the mobile device;
   a side pocket located at one of the two sides of the case for receiving a self-defense mechanism; and
   a cover for covering the opening of the side pocket,
   wherein the back of the case is configured to substantially cover a back of the mobile device.

2. The case as set forth in claim 1, wherein the self-defense mechanism is at least one of a vial containing pepper spray, a vial containing mace, a vial containing dye, a vial containing a foaming agent, a vial containing a stench ointment, a stun gun, and a personal alarm.

3. The case as set forth in claim 1, wherein the cover closes the side pocket by way of one of velcro and a snap.

4. The case as set forth in claim 1, wherein the back of the case has an opening for a camera lens of the mobile device.

5. The case as set forth in claim 1, wherein one of the sides of the case has an opening for a panic button of the mobile device.

6. A case for a mobile device, comprising:
   a front, a back, and two sides;
   a main pocket disposed at the front of the case for receiving the mobile device, wherein the main pocket is configured to receive all four corners of the mobile device and to show a display of the mobile device;

the case being further adapted to receive a self-defense mechanism in a side pocket located at one of the two sides of the case, wherein the back of the case is configured to substantially cover a back of the mobile device.

7. The case as set forth in claim 6, wherein the self-defense mechanism is at least one of a vial containing pepper spray, a vial containing mace, a vial containing dye, a vial containing a foaming agent, a vial containing a stench ointment, a stun gun, and a personal alarm.

8. The case as set forth in claim 6, the case further comprising a cover for covering the opening of the side pocket.

9. The case as set forth in claim 8, wherein the cover closes the side pocket by way of one of velcro and a snap.

10. The case as set forth in claim 6, wherein the case is made of leather.

11. The case as set forth in claim 6, wherein the back of the case has an opening for a camera lens of the mobile device.

12. The case as set forth in claim 6, wherein one of the sides of the case has an opening for a panic button of the mobile device.

13. A self-defense device, comprising:
a mobile device;
a self-defense mechanism; and
a case for holding the mobile device and the self-defense mechanism,
wherein the case comprises:
a front, a back, and two sides,
a main pocket disposed at the front of the case for receiving the mobile device, wherein the main pocket is configured to receive all four corners of the mobile device and to show a display of the mobile device, and
a side pocket located at one of the two sides of the case for receiving the self-defense mechanism,
wherein the back of the case is configured to substantially cover a back of the mobile device.

14. The self-defense device as set forth in claim 13, wherein the self-defense mechanism is attached to the mobile device by way of a clip.

15. The self-defense device as set forth in claim 13, wherein the self-defense mechanism is removably attached to the mobile device.

16. The self-defense device as set forth in claim 13, wherein the self-defense mechanism is permanently secured to the mobile device.

17. The self-defense device as set forth in claim 13, wherein the case is adapted to receive the self-defense mechanism by way of a clip or a loop on an outside of the case.

18. The self-defense device as set forth in claim 13, wherein the self-defense mechanism is at least one of a vial containing pepper spray, a vial containing mace, a vial containing dye, a vial containing a foaming agent, a vial containing a stench ointment, a stun gun, and a personal alarm.

19. The self-defense device as set forth in claim 13, wherein the back of the case has an opening for a camera lens of the mobile device.

20. The self-defense device as set forth in claim 13, wherein one of the sides of the case has an opening for a panic button of the mobile device.

* * * * *